UNITED STATES PATENT OFFICE.

WILFORD L. PALMER, OF NEW YORK, N. Y.

MANUFACTURE OF BUTTONS OR OTHER ARTICLES FROM PLASTIC MATERIALS.

SPECIFICATION forming part of Letters Patent No. 225,638, dated March 16, 1880.

Application filed February 19, 1880.

*To all whom it may concern:*

Be it known that I, WILFORD L. PALMER, of the city, county, and State of New York, have invented a new and useful Improvement in the Manufacture of Buttons or other Articles from Plastic Materials, which improvement is fully described in the following specification.

My invention is especially adapted to the manufacture of buttons or other articles for useful or ornamental purposes from plastic materials containing moisture and requiring the combined action of heat and pressure—as, for example, blood, or a mixture of blood with another material or materials. The plastic material is usually placed in a cellular die, where it is subjected to the action of plungers, each cell and plunger forming one article.

Prior to my invention the heat required in the aforesaid process was applied to the plungers, as by arranging the same to work in a steam-heated chest or box, the degree of heat so applied being such as to raise the temperature of the plungers above the boiling-point of water; or, in the event of using a die that has a top plate to which the plungers are affixed, the top plate is the medium for heating the plungers.

The action of heat and pressure on a plastic material containing moisture—such as, for example, dried blood or blood and hoof-dust—is to render the article pressed or molded from such material hard, solid, and with a surface easily polished, the pressure giving it form and the heat working a chemical change in the material. Since, in the aforesaid process, the plungers bear on the top of the material, it follows that the moisture is driven downward or toward the bottom of the die. This is a disadvantage, because the bottom of the die tends to resist the escape of any part of the moisture not absorbed by the material while undergoing the chemical change referred to, not only on account of the solidity of the die, but also because of the heat which is communicated to and absorbed by the die, and which acts on the material with a tendency to drive the moisture upward or toward the center of the article which is being molded. The result is, that a certain amount of moisture remains embedded in the molded article.

In the manufacture of buttons by the aforesaid process I have found that in a comparatively short time after the requisite holes are drilled therein the article cracks and is unfit for use, and after various experiments it was discovered that this is due to the escape through the holes of the button of the moisture which is retained therein in the molding process, as before stated.

To overcome this objection is the object of my invention, which consists in placing the material to be molded in a die sufficiently cool, then heating such die to a temperature above the boiling-point of water, (or to such a temperature that the heat of the die will at once evaporate water thrown upon it,) and pressing or molding the same therein by means of plungers, (one or more,) the temperature of the plungers being kept below the boiling-point of water, so that no heat is communicated to the plungers except what they may receive from the die during the process of pressing or molding.

In carrying out my invention I construct and arrange the die and plungers to operate in substantially the usual manner, and for the purpose of heating the die I use a bed or support to which the heat is applied by suitable means, as steam, while I fit the plungers in guides or plates, where they are kept at a comparatively low temperature, the only heat which they receive being that communicated thereto by the die.

To fill the die I remove the same from its heated support, and after it has cooled off sufficiently I place the material therein. I then return the die to its support, which is beneath the plungers, and produce the required pressure of the plungers upon the material to mold the same. It will be readily perceived that by the action of the heat applied to the die the moisture is driven through the material in an upper direction. The plungers, being of a lower temperature than the die, do not prevent the upward passage of the moisture in the material, and it follows that the moisture not absorbed in the chemical change of the material during the action of the heat and pressure is located near the top surface or back of the button or molded article, instead of at the center or middle thereof, thereby causing the article to have a thicker, denser, and harder front than heretofore, so that when, as in the case of buttons, holes are drilled through them they retain their solidity.

What I claim as new, and desire to secure by Letters Patent, is—

The within-described process of molding buttons or other articles from blood or other material containing moisture, consisting in placing the material in a die sufficiently cool, then heating the die to a temperature above the boiling-point of water and pressing the material therein by means of plungers, (one or more,) no heat being communicated to the plungers except what they receive from the die during their contact with the same during the operation of pressing or molding, substantially as described.

In testimony that I claim the foregoing I have hereunto set my hand this 18th day of February, 1880.

W. L. PALMER.

Witnesses:
  CHAS. WAHLERS,
  W. C. HAUFF.